United States Patent [19]
Kepplinger et al.

[11] Patent Number: 5,961,690
[45] Date of Patent: Oct. 5, 1999

[54] PROCESS FOR PRODUCING MOLTEN PIG IRON OF LIQUID STEEL PREPRODUCTS AND PLANT FOR CARRYING OUT THE PROCESS

[75] Inventors: Werner Leopold Kepplinger, Leonding; Felix Wallner; Johannes-Leopold Schenk, both of Linz, all of Austria

[73] Assignees: Voest-Alpine Industrieanlagenbau GmbH, Linz, Austria; Pohang Iron & Steel Co., Ltd; Research Institute of Industrial Science & Technology, Incorporated Foundation, both of Pohang, Rep. of Korea

[21] Appl. No.: 08/860,241
[22] PCT Filed: Oct. 8, 1996
[86] PCT No.: PCT/AT96/00191
  § 371 Date: Jun. 10, 1997
  § 102(e) Date: Jun. 10, 1997
[87] PCT Pub. No.: WO97/13880
  PCT Pub. Date: Apr. 17, 1997

[30] Foreign Application Priority Data
  Oct. 10, 1995 [AT] Austria ................................. 1681/95

[51] Int. Cl.⁶ ............................... C22B 5/14; C21B 13/14
[52] U.S. Cl. ........................... 75/446; 266/160; 266/172; 266/156
[58] Field of Search .............................. 75/446; 266/160, 266/172, 156

[56] References Cited

U.S. PATENT DOCUMENTS 2,547,685  4/1951  Brassert et al. .
5,185,032  2/1993  Whipp .
5,338,336  8/1994  Greenwalt .
5,433,767  7/1995  Bresser et al. ............................ 75/450

FOREIGN PATENT DOCUMENTS 0255180  2/1988  European Pat. Off. .
0488429  6/1992  European Pat. Off. .
0571358  11/1993 European Pat. Off. .
0594557  4/1994  European Pat. Off. .
0614990  9/1994  European Pat. Off. .
1163353  2/1964  Germany .
3100767  1/1982  Germany .

*Primary Examiner*—Melvyn Andrews
*Attorney, Agent, or Firm*—Ostrolenk, Faber, Gerb & Soffen, LLP

[57] ABSTRACT

In a process for producing molten pig iron or liquid steel pre-products, from particulate iron-oxide-containing material by fluidization, the iron-oxide-containing material is prereduced in at least one prereduction stage (7) by aid of a reducing gas and subsequently is reduced to sponge iron in a final reduction stage (8), the sponge iron is melted in a meltdown-gasifying zone (11) under the supply of carbon carriers and an oxygen-containing gas, and a CO- and $H_2$-containing reducing gas is produced which is introduced into the final reduction stage (8), is reacted there, is drawn off, subsequently is introduced into a prereduction stage (7), is reacted there, is drawn off, subjected to scrubbing and subsequently is carried off as an export gas and wherein at least a portion of the reacted reducing gas is purified from $CO_2$, is heated and is used as a recycle-reducing gas for the reduction of the iron-oxide-containing material. To ensure reduction while avoiding the occurrence of "sticking", while also minimizing the amount of carbon carriers charged, a portion of the reducing gas flowing from the final reduction stage (8) into the prereduction stage (7) is branched off, washed, purified from $CO_2$ and heated and subsequently is recycled to the final reduction stage (8) (FIG. 1).

19 Claims, 2 Drawing Sheets

PROCESS FOR PRODUCING MOLTEN PIG IRON OF LIQUID STEEL PREPRODUCTS AND PLANT FOR CARRYING OUT THE PROCESS

The invention relates to a process for producing molten pig iron or liquid steel pre-products, from particulate iron-oxide-conitaininig material by fluidization, wherein the iron-oxide-containing material is prereduced in at least one prereduction stage by aid of a reducing gas and subsequently is reduced to sponge iron in a final reduction stage, the sponge iron is melted in a meltdown-gasifying zone under the supply of carbon carriers and an oxygen-containing gas, and a CO- and $H_2$-containing reducing gas is produced which is introduced into the final reduction stage, is reacted there, is drawn off, subsequently is introduced into at least one prereduction stage, is reacted there, is drawn off, subjected to scrubbing and subsequently is carried off as an export gas and wherein at least a portion of the reacted reducing gas is purified from $CO_2$, is heated and is used as a recycle-reducing gas for the reduction of the iron-oxide-containing material, and a plant for carrying out the process.

A process of this type is known from U.S. Pat. No. 5,185,032. With this process, in order to utilize the reduction potential and the thermal energy of the reducing gas to the largest possible extent, the reducing gas is conducted through all reduction stages and through preheating stages preceding them in the flow direction of the iron-oxide-containing material, is withdrawn from the first preheating stage as a top gas and subsequently washed, A portion of the top gas is compressed, subjected to $CO_2$-elimination and subsequently heated. The top gas thus heated and to a large extent purified from $CO_2$ subsequently is fed to the reduction process as a recycle-reducing gas, whereby it becomes feasible to exploit the reductants still present within the top gas. One disadvantage involved here is, however, that each of the fluidized-bed reduction stages and each of the preheating stages has to be dimensioned such as to be capable of being operated with the total amount of gas, i.e. freshly produced reducing gas plus recycle-reducing gas.

In the reduction of iron oxides by fluidization utilizing $CO/CO_2$ mixtures directional, acicular iron precipitations occur on the surface of the fine ore particles at higher temperatures (f.i. in excess of 700° C.) and at a lower reduction potential (i.e. at increased $CO_2$ and $H_2O$ contents of the reducing gas). These iron precipitations are at the origin of the "sticking" phenomenon in fluidized beds. With very high degrees of reduction, agglutination of the ore occurs, whereby the reduction process is hampered. If, however, reduction takes place at a very high or at the highest reduction potential of the reducing gas, iron precipitation will be dense or porous, and "sticking" cannot be observed there.

The invention aims at avoiding these disadvantages and difficulties and has as its object to provide a process and a device for carrying out the process which ensure reduction without the occurrence of "sticking", through an increase in the reduction potential of the reducing gas, wherein, however, the amount of carbon carriers utilized for producing the reducing gas is not to be increased; rather, saving of carbon carriers is to be achieved in comparison to the prior art.

In accordance with the invention this object is achieved in that a portion of the reducing gas flowing from the final reduction stage into the prereduction stage is branched off, washed, purified from $CO_2$ and heated and subsequently is recycled to the final reduction stage.

It is true that with the process according to the invention one renounces exploiting the reduction potential still present within the reducing gas exiting the final reduction stage and branched off from the same for the further reduction stages and/or any preheating stages that may be provided, but it is precisely from this fact that essential advantages result:

In accordance with the invention, a high reduction potential is ensured by increasing the amount of reducing gas, wherein with the reduction process effected step by step an increased amount of reducing gas is provided only in the final reduction stage. Hereby, "sticking" is reliably avoided in the final reduction stage, in which the temperature is highest and the danger of "sticking" greatest, at the same time also obviating the need to dimension all parts of the plant, that is, all gas ducts, reactors, compressors etc., any preheating stages and fluidized bed reduction stages that may be provided, in such a manner that they can be operated with an increased amount of reducing gas.

Thus the invention enables the selective utilization of a high reduction potential and, as a consequence, the other reduction stages can be provided with the theoretical minimum amount of reducing gas and hence can be dimensioned proportionately smaller and less expensive.

As a result, it is not only feasible to dimension all parts of the plant in an optimum manner, namely as small as possible—at the maximum production capacity possible—, but with this process it also becomes feasible to make (do with the smallest amount possible of the carbon carriers required in producing the reducing gas, in other words, coal consumption can be minimized while reliably avoiding any danger of "sticking". Furthermore, it is feasible to utilize coals that are high in $C_{fix}$ and low in ashes in the melt-down gasifying zone—in spite of the fact that these coals form only insufficient amounts of reducing gas—and still achieve an even thermal balance, i.e. it becomes feasible to introduce only a small quantity of water into the melt-down gasifying zone in order to increase the amount of reducing gas.

Since a very high reduction potential is available for the last reduction stage, the portion of the reducing gas that has been taken from the final reduction stage and branched off from and recircled into the same can be heated to a reduction temperature ranging from 800 to 900° C., for instance to a temperature of some 850° C.

Advantageously, the reducing gas withdrawn and branched off from the final reduction stage is heated to reduction temperature in a recuperative and/or regenerative manner and/or by partially combustinig the portion of the reducing gas that has been withdrawn.

Preferably, recycling of the heated reducing gas is effected by admixing it to the hot reducing gas exiting the meltdown-gasifying zone after said hot reducing gas has been dedusted.

In order to cool down the reducing gas leaving the melter gasifier to reduction temperature, suitably a portion of the reducing gas purified from $CO_2$ is recycled in the cold state, preferably is admixed to the hot reducing gas exiting the meltdown-gasifying zone prior to the introduction thereof into the final reduction stage.

For simple temperature adjustment in the final reduction stage, advantageously a portion of the hot reducing gas exiting the meltdown-gasifying zone is washed and subsequently is admixed, in the cold state, to the hot reducing gas exiting the meltdown-gasifying zone, preferably by being admixed to the reducing gas that has been purified from $CO_2$ and recycled in the cold state.

A further option for adjusting the temperature in the fluidized-bed reduction zones is based on the fact that the prereduction stage is preceded by at least one preheating stage for the iron-oxide-containing material and the reacted reducing gas exiting the prereduction stage is used for preheating the iron-oxide-containing material, preferably after branching off a portion of the reacted reducing gas.

In order to adjust the preheating temperature of the iron-oxide-containing material to the process requirements, ie. to optimize the temperature in the fluidized-bed reduction zones, suitably the reacted reducing gas used for preheating is subjected to partial combustion.

A plant for carrying out the process, comprising at least two fluidized bed reactors consecutively arranged in series, wherein the iron-oxide-containing material is conducted from fluidized bed reactor to fluidized bed reactor via conveying ducts in one direction and the reducing gas is conducted from fluidized bed reactor to fluidized bed reactor via reducing-gas connection ducts in the opposite direction, and comprising a melter gasifier into which a conveying duct conducting the reduction product from the fluidized bed reactor arranged last in the flow direction of the iron-oxide-containing material runs and which includes feed ducts for oxygen-containing gases and carbon carriers as well as a tap for pig iron or steel pre-material and slag as well as a reducing-gas feed duct for reducing gas formed in the melter gasifier, which runs into the fluidized bed reactor arranged last in the flow direction of the iron-oxide-containing material, characterized in that from the reducing-gas connection duct connecting the fluidized bed reactor arranged last in the flow direction of the iron-oxide-containing material with the preceding fluidized bed reactor, a branch duct departs that runs into the reducing-gas feed duct via a scrubber, a $CO_2$-elimination means and a gas heater.

A preferred embodiment is characterized in that the gas heater can be by-passed by means of a reducing-gas by-pass duct.

Here, suitably a reducing-gas dedusting means is provided within the reducing-gas feed duct and the branch duct runs into the reducing-gas feed duct at a position between the reducing-gas dedusting means and the fluidized bed reactor.

Another preferred embodiment is characterized in that departing from the reducing-gas feed duct a reducing-gas recycling duct runs back into the reducing-gas feed duct via a scrubber and a compressor, yet at a position before the branching-off gas recycling duct if viewed in the gas flow direction, in particular before a dedusting means arranged in the reducing-gas feed duct.

Advantageously, viewed in the flow direction of the iron-oxide-containing material, the first fluidized bed reduction reactor is preceded by at least one fluidized bed preheating reactor into which a reducing-gas discharge duct runs that departs from the first fluidized bed reduction reactor viewed in the flow direction of the iron-oxide-containing material, wherein furthermore, a duct feeding an oxygen-containing gas or oxygen suitably runs into the fluidized bed preheating reactor.

BRIEF DESCRIPTION OF THE DRAWINGS

In the appended drawings, each of FIGS. 1 and 2 is a block diagram depicting a variant of the process of the invention.

DESCRIPTION OF THE PREFERRED EMBODIMENTS

Figure 1:
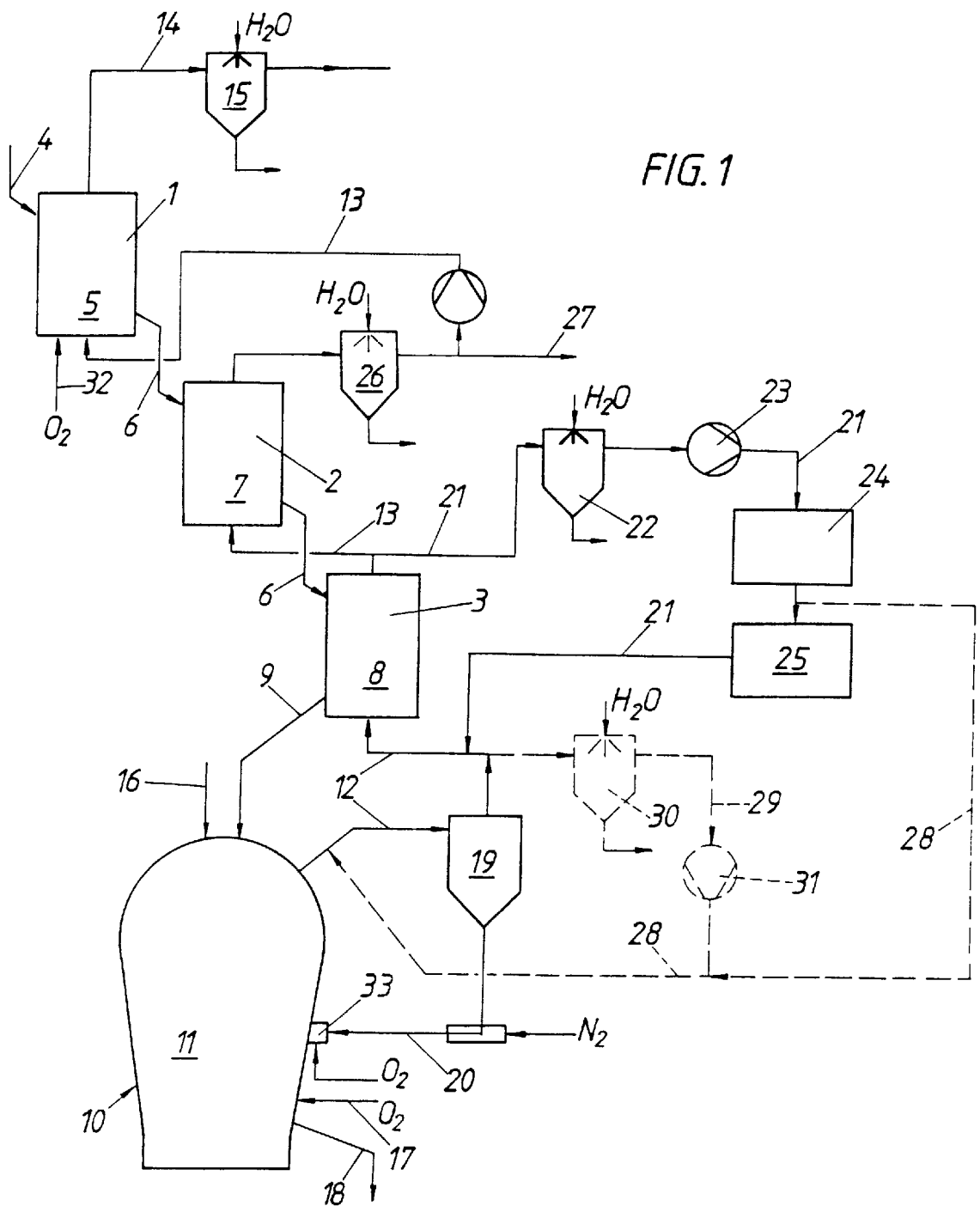

The plant according to the invention is provided with three fluidized bed reactors 1 to 3 subsequently arranged in series, wherein iron-oxide-containing material, such as fine ore, via an ore supply duct 4 is fed to the first fluidized bed reactor 1 in which in a preheating stage 5 preheating of the fine ore and optionally a prereduction takes place and subsequently is conducted from fluidized bed reactor 1 to fluidized bed reactor 2, 3 via conveying ducts 6. Prereduction is effected in the fluidized bed reactor 2 in a prereduction stage 7, and a final reduction of the fine ore to sponge iron takes place in the fluidized bed reactor 3 in a final reduction stage 8.

Through a conveying duct 9 the completely reduced material, that is, the sponge iron, is conducted into a melter gasifier 10. In a melt-down gasifying zone 11 within the melter gasifier 10, a CO- and $H_2$-containing reducing gas is produced from coal and oxygen-containing gas and is introduced into the fluidized bed reactor 3 arranged last in the direction of flow of the fine ore, via the reducing-gas feed duct 12. The reducing gas subsequently is conducted from fluidized bed reactor 3 to fluidized bed reactor 2 to 1 in counterflow to the ore flow, via the connection ducts 13, is discharged from the fluidized bed reactor 1 as a top gas via a top-gas discharge duct 14 and subsequently is cooled in a wet scrubber 15 and scrubbed.

The melter gasifier 10 is provided with a feed duct 16 for solid carbon carriers, a feed duct 17 for oxygen-containing gases as well as optionally feed ducts for carbon carriers, such as hydrocarbons, that are liquid or gaseous at room temperature as well as for calcined fluxes. In the melter gasifier 10 molten pig iron or molten steel pre-material and molten slag collect below the melt-down gasifying zone 11, which are tapped off via a tap 18.

In the reducing-gas feed duct 12 departing from the melter gasifier 10 and opening into the fluidized bed reactor 3, a (dedustification means 19, such as a hot cyclone, is provided, the dust particles separated in said cyclone being fed to the melter gasifier 10 via the recirculating duct 20, with nitrogen as a conveying medium and via a burner 33, under the injection of oxygen.

From the reducing-gas connection duct 13 connecting the fluidized bed reactor 3 with the fluidized bed reactor 2, a branch duct 21 departs through which a portion of the reducing gas reacted in the fluidized bed reactor 3 is carried off. This branch duct 21 opens into a scrubber 22 and from the scrubber leads to a $CO_2$-elimination means 24 via a compressor 23. Said means may for instance be designed as a pressure-swing adsorption plant or as a $CO_2$-scrubber. From the $CO_2$-elimination means 24 the branch duct 21 leads to a gas heater 25 and eventually opens into the reducing-gas feed duct 12, and that preferably between the hot gas cyclone 19 and he fluidized bed reactor 3.

Hereby it becomes feasible to free a portion of the reducing gas reacted in the fluidized bed reactor 3 from $CO_2$ to a large extent, such that—subsequent to being heated to reducing-gas temperature, preferably to a temperature lying between 800° C. and 900° C.—it becomes available again as a reducing gas exhibiting a high reduction potential. Thus the final reduction stage 8 is supplied with a particularly large amount of reducing gas, such that in spite of the relatively high temperature in the final reduction stage 8 there is no danger of "sticking", due to the substantial amount of reductants that are available.

Heating of the portion of the reducing gas carried off via the branch duct 21 is effected in a regenerative or recuperative manner or by partial combustion of this gas, wherein these heating methods may be applied individually or in combinations of two or three.

The fluidized bed reactor 2, in which the prereduction of the fine ore takes place, is supplied with a much smaller amount of reducing gas that, in addition, exhibits a smaller reduction potential, which, however, is absolutely sufficient for prereduction. Since, here, the accomplished degree of reduction of the material to be reduced is lower than in the final reduction stage 8, "sticking" does not occur here. Consequently, this fluidized bed reactor 2 and its gas feed and discharge ducts 13 etc. are dimensioned as a function of the reduced amount of reducing gas that is conducted through this fluidized bed reactor 2. The reacted reducing gas exiting this fluidized bed reactor 2 is conducted to a scrubber 26 via the duct 13. A portion of the washed and reacted reducing gas is withdrawn via an export-gas discharge duct 27; another portion is conducted to the preheating stage 5, that is to the fluidized bed reactor 1, via the duct 13.

Preferably the gas heater 25 can be bypassed by means of a by-pass duct 28 for a portion of the recycled reducing gas, with the by-pass duct 28 opening into the reducing-gas feed duct 12, linking the melter gasifier 10 to the fluidized bed reactor 3. Thus, via this by-pass duct 28 cold recycle-reducing gas can be mixed with the hot reducing gas exiting the melter gasifier 10, volume control enabling the simple acustment of the desired reducing-gas temperature.

A further possibility fr adjusting the reducing-gas temperature arises due to the gas recycling duct 29 which is preferably provided and which departs from the reducing-gas feed duct 12 and via the scrubber 30 and compressor 31 conducts a portion of the reducing gas back into this reducing-gas feed duct 12 again, at a position before the hot gas cyclone 19.

According to the process variant or plant depicted in FIG. 5, after each of the fluidized bed reactors 1 to 3 a portion of the reacted reducing gas is branched off, whereby each of the fluidized bed reactors 1 to 3 is fed only the amount of gas actually needed for ensuring the smooth functioning of the respective fluidized bed reactor.

Figure 2:
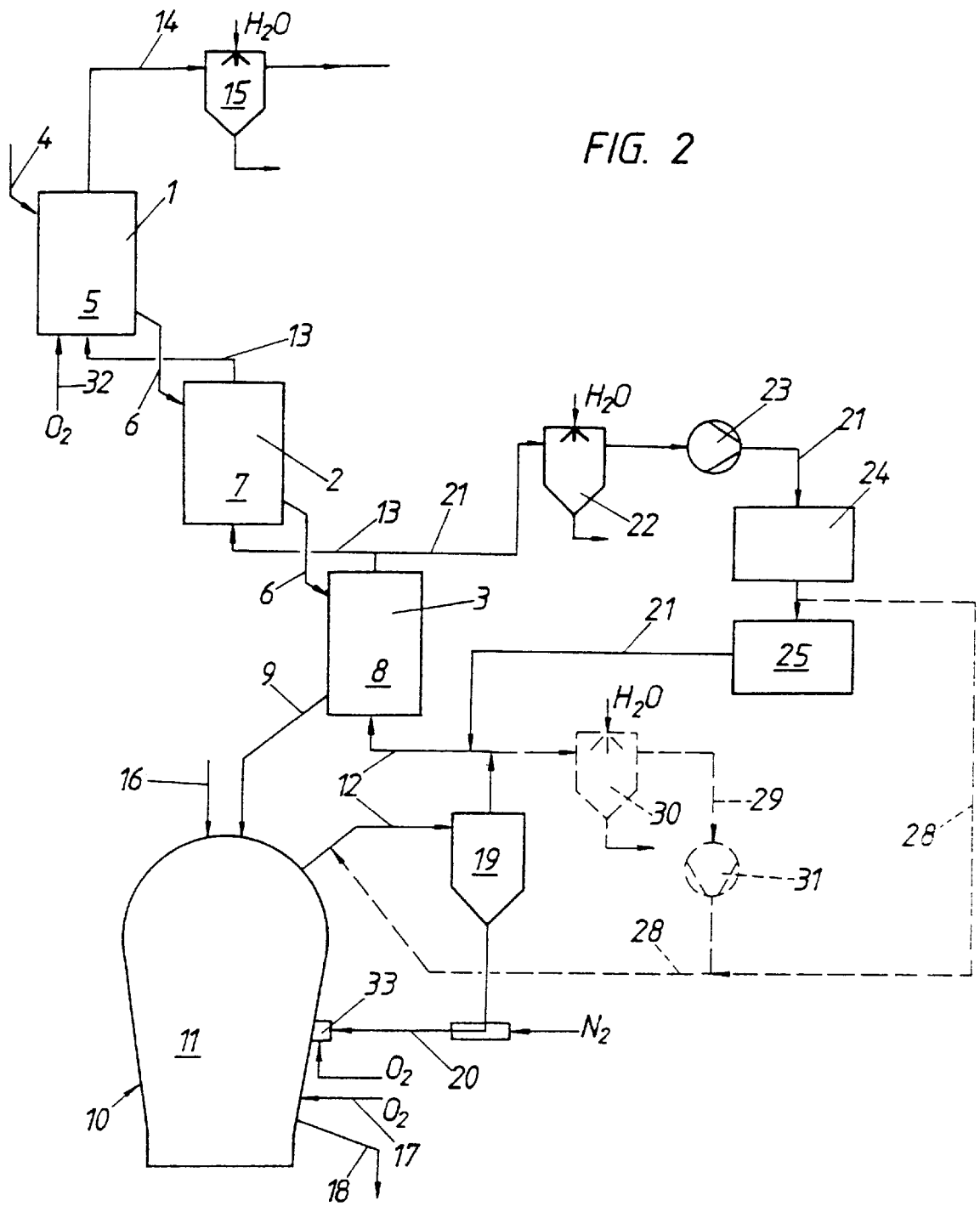

In accordance with the process variant illustrated in FIG. 2 all of the reacted reducing gas exiting the fluidized bed reactor 2 is utilized in the preheating stage 5. Here, the entire sensible heat of the reacted reducing gas exiting the fluidized bed reactor 2 is utilized for preheating the fine ore.

In order to adjust the preheating the temperature of the fine ore it is feasible to supply an oxygen-containing gas, such as air or oxygen, to the preheating stage 5, that is, to the fluidized bed reactor 1, via a duct 32, whereby partial combustion of the reacted reducing gas supplied to the preheating stage 5 is effected. By controlling partial combustion it becomes feasible to adjust the temperature of the fine ore during the preheating operation in such a way as to optimize temperatures in the subsequent reduction stages 7, 8.

The invention is not limited to the exemplary embodiments illustrated in the drawing but can be modified in various respects. For example it is feasible to select the number of fluidized bed reactors as a function of actual requirements.

EXAMPLE

In a plant corresponding to FIG. 1 of the drawing, 31.4 t coal/h having the chemical composition shown in Table I are charged to the melter gasifier 10 in order to produce 40 t pig iron/h and are gasified with 31,240 Nm$^3$ O$_2$/h.

TABLE I

| coal (dry) | |
|---|---|
| C | 78.9% |
| H | 3.8% |
| N | 1.0% |

TABLE I-continued

| coal (dry) | |
|---|---|
| O | 2.0% |
| ashes | 8.7% |
| C$_{fix}$ | 72.0% |

To this plant, ore is charged in an amount of 58.6 t/h, at an ore analysis as shown in Table II, as well as fluxes in an amount of 8.6 t/h in accordance with Table III. The pig iron produced in the plant exhibits the chemical coimposition set forth in Table IV.

TABLE II

| ore (moist) | |
|---|---|
| Fe | 64.9% |
| Fe$_2$O$_3$ | 92.4% |
| LOI | 0.3% |
| moisture | 1% |

TABLE III

| fluxes | |
|---|---|
| CaO | 45.0% |
| MgO | 9% |
| SiO$_2$ | 1% |
| Al$_2$O$_3$ | 0.5% |
| loss on ignition | 40% |

TABLE IV

| pig iron | |
|---|---|
| C | 4.2% |
| Si | 0.3% |
| Mn | 0.04% |
| P | 0.04% |
| S | 0.02% |
| Fe | balance |

In the melter gasifier 10, reducing gas is produced in an amount of 63,440 Nm$^3$/h and having a temperature of 870° C. It has the chemical composition given in Table V. This reducing gas is mixed with recycle-reducing gas supplied via the branch duct 21, in an amount of some 68,000 Nm$^3$/h and at a temperature post heating in the gas heater 25 of 870° C., whereby it becomes feasible to supply a reducing gas to the final reduction stage 8 in an amount of 116,760 Nm$^3$/h and at a temperature of 870° C. This reducing gas has the chemical composition shown in Table VI.

TABLE V

| reducing gas from the melter gasifier 10 870° C. | |
|---|---|
| CO | 71.3% |
| CO$_2$ | 0.6% |
| H$_2$ | 23.0% |
| H$_2$O | 0.5% |
| N$_2$ + Ar | 4.3% |
| CH$_4$ | 0.3% |

TABLE VI

| reducing gas for final reduction stage 8 870° C. | |
| --- | --- |
| CO | 62.2% |
| $CO_2$ | 2.1% |
| $H_2$ | 19.8% |
| $H_2O$ | 1.0% |
| $N_2$ + Ar | 14.6% |
| $CH_4$ | 0.3% |

Of the partially reacted reducing gas escaping from the final reduction stage 8, a portion in the amount of some 68,000 Nm³/h, of the chemical composition shown in Table VII, is withdrawn and is conducted to a $CO_2$-scrubber 24 via a branch duct 21. The export gas carried off through the ducts 27 and 14 incurs in an amount of 47,720 Nm³/h. Its chemical composition is shown in Table VIII.

TABLE VII

| branched-off reducing gas before $CO_2$-scrubbing, 70° C. | |
| --- | --- |
| CO | 54.3% |
| $CO_2$ | 11.8% |
| $H_2$ | 16.8% |
| $H_2O$ | 1.5% |
| $N_2$ + Ar | 15.3% |
| $CH_4$ | 0.3% |

TABLE VIII

| export gas, 70° C. | |
| --- | --- |
| CO | 39.9% |
| $CO_2$ | 28.3% |
| $H_2$ | 13.2% |
| $H_2O$ | 1.6% |
| $N_2$ + Ar | 16.7% |
| $CH_4$ | 0.3% |

We claim:

1. A process for producing molten pig iron or liquid steel pre-products, from particulate iron-oxide-containing material by fluidization, wherein the iron-oxide-containing material is prereduced in at least one prereduction stage (7) by aid of a reducing gas and subsequently is reduced to sponge iron in a final reduction stage (8), the sponge iron is melted in a meltdown-gasifying zone (11) under the supply of carbon carriers and an oxygen-containing gas, and a CO- and $H_2$-containing reducing gas is produced which is introduced into the final reduction stage (8), is reacted there, is drawn off, subsequently is introduced into at least one prereduction stage (7), is reacted there, is drawn off, subjected to scrubbing and subsequently is carried off as an export gas and wherein at least a portion of the reacted reducing gas is purified from $CO_2$, is heated and is used as a recycle-reducing gas for the reduction of the iron-oxide-containing material, characterized in that a portion of the reducing gas flowing from the final reduction stage (8) into the prereduction stage (7) is branched off, washed, purified from $CO_2$ and heated and subsequently is recycled to the final reduction stage (8).

2. A process according to claim 1, characterized in that the reducing gas withdrawn and branched off from the final reduction stage (8) is heated to reduction temperature.

3. A process according to claim 1, characterized in that the reducing gas withdrawn and branched off from the final reduction stage (8) is heated to reduction temperature in a recuperative and/or regenerative manner and/or by partially combusting the portion of the reducing gas that has been withdrawn.

4. A process according to claim 1, characterized in that recycling of the heated reducing gas is effected by admixing it to the hot reducing gas exiting the meltdown-gasifying zone (11) after said hot reducing gas has been freed of dust.

5. A process according to claim 1, characterized in that a portion of the reducing gas purified of $CO_2$ is recycled, in the cold state.

6. A process according to claim 1, characterized in that a portion of the hot reducing gas exiting the meltdown-gasifying zone (11) is washed and subsequently is admixed, in the cold state, to the hot reducing gas exiting the meltdown-gasifying zone (11).

7. A process according to claim 1, characterized in that the prereduction stage (7) is preceded by at least one preheating stage (5) for the iron-oxide-containing material and the reacted reducing gas exiting the prereduction stage (7) is used for preheating the iron oxide-containing material.

8. A process according to claim 7, characterized in that the reacted reducing gas used for preheating is subjected to partial combustion.

9. A plant for producing molten pig iron or liquid steel pre-products comprising at least two fluidized bed reactors (1, 2, 3) consecutively arranged in series, wherein the iron-oxide-containing material is conducted from fluidized bed reactor (1) to fluidized bed reactor (2, 3) via conveying ducts (6) in one direction and the reducing gas is conducted from fluidized bed reactor (3) to fluidized bed reactor (2, 1) via reducing-gas connection ducts (13) in the opposite direction, and comprising a melter gasifier (10) into which a conveying duct (9) conducting the reduction product from the fluidized bed reactor (3) arranged last in the flow direction of the iron-oxide-containing material runs and which includes feed ducts (17, 16) for oxygen-containing gases and carbon carriers as well as a tap (18) for pig iron or steel pre-material and slag as well as a reducing-gas feed duct (12) for reducing gas formed in the melter gasifier (10), which runs into the fluidized bed reactor (3) arranged last in the flow direction of the iron-oxide-containing material, characterized in that from the reducing-gas connection duct (13) connecting the fluidized bed reactor (3) arranged last in the flow direction of the iron-oxide-containing material with the preceding fluidized bed reactor (2), a branch duct (21) departs that runs into the reducing-gas feed duct (12) via a scrubber (22), a $CO_2$-elimination means (24) and a gas heater (25).

10. A plant according to claim 9, characterized in that the gas heater (25) can be by-passed by means of a reducing-gas by-pass duct (28).

11. A plant according to claim 10, characterized in that a reducing-gas dedusting means (19) is provided within the reducing-gas feed duct (12) and the branch duct (21) runs into the reducing-gas feed duct (12) at a position between the reducing-gas dedusting means (19) and the fluidized bed reactor (3).

12. A plant according to claim 9, characterized in that departing from the reducing-gas feed duct (12) a reducing gas recycling duct (29) runs back into the reducing-gas feed duct (12) via a scrubber (30) and a compressor (30) and a compressor (31), yet at a position before the branching-off gas recycling duct (29) if viewed in the gas flow direction.

13. A plant according to claim 9, characterized in that, viewed in the flow direction of the iron-oxide-containing material, the first fluidized bed reduction reactor (7) is preceded by at least one fluidized bed preheating reactor (1) into which a reducing-gas discharge duct (13) runs that departs from the first fluidized bed reduction reactor (7) viewed in the flow direction of the iron-oxide-containing material.

14. A plant according to claim 13, characterized in that, furthermore, a duct (32) feeding an oxygen-containing gas or oxygen runs into the fluidized bed preheating reactor (1).

15. A process according to claim 2, wherein the withdrawn, branched off reducing gas to heated to a temperature between 800° and 900° C.

16. A process according to claim 5, wherein the reducing gas purified of $CO_2$ is recycled by admixing it with the hot reducing gas exiting the meltdown-gasifying zone (11) prior to the introduction thereof into the final reduction stage (8).

17. A process according to claim 6, wherein the washed hot reducing gas exiting the meltdown-gasifying zone (11) is admixed with the recycled reducing gas that has been purified of $CO_2$.

18. A process according to claim 7, wherein the reacted reducing gas exiting the prereduction stage (7) is used for preheating the iron oxide containing material after a portion of said reacted reducing gas has been branched off.

19. A plant according to claim 12 wherein said reducing gas duct is positioned before a duct remaining means (19) arranged in the reducing gas feed duct (12).

* * * * *